United States Patent [19]

Close

[11] 3,883,089
[45] May 13, 1975

[54] SAFETY BELT DEVICE
[75] Inventor: Albert R. Close, Sepulveda, Calif.
[73] Assignee: American Safety Equipment Corporation, Encino, Calif.
[22] Filed: Oct. 29, 1973
[21] Appl. No.: 410,498

[52] U.S. Cl. .............................................. 242/107.4
[51] Int. Cl. ............................................ B65h 75/48
[58] Field of Search .................. 242/107.4, 107 SB; 297/388; 280/150 SB

[56] References Cited
UNITED STATES PATENTS

| | | | |
|---|---|---|---|
| 3,064,920 | 11/1962 | Cushman | 242/107.4 |
| 3,180,456 | 4/1965 | Whittingham | 242/107.4 X |
| 3,593,942 | 7/1971 | Rex | 242/107.4 |
| 3,598,336 | 8/1971 | Frost | 242/107.4 |
| 3,819,126 | 6/1974 | Stoffel | 242/107.4 |

Primary Examiner—Edward J. McCarthy
Attorney, Agent, or Firm—Miketta, Glenny, Poms & Smith

[57] ABSTRACT

A safety belt retractor having a frame, a strap receiving spool mounted for rotation on the frame with the spool being urged into a strap wound position and a lockbar is provided having a pawl for engaging the teeth of a ratchet tooth gear. Inertia responsive means are associated with the lockbar which is normally biased into a position out of engagement with the gear, the inertia responsive means being responsive to sudden acceleration of the strap off the spool for causing the lockbar pawl to engage with the teeth. The inertia responsive means is selectively blocked from causing the pawl to engage with the teeth upon sudden acceleration of the strap off the spool during protraction of the strap off of the spool and is responsive to a retractive movement of the strap to move into a released position.

12 Claims, 4 Drawing Figures

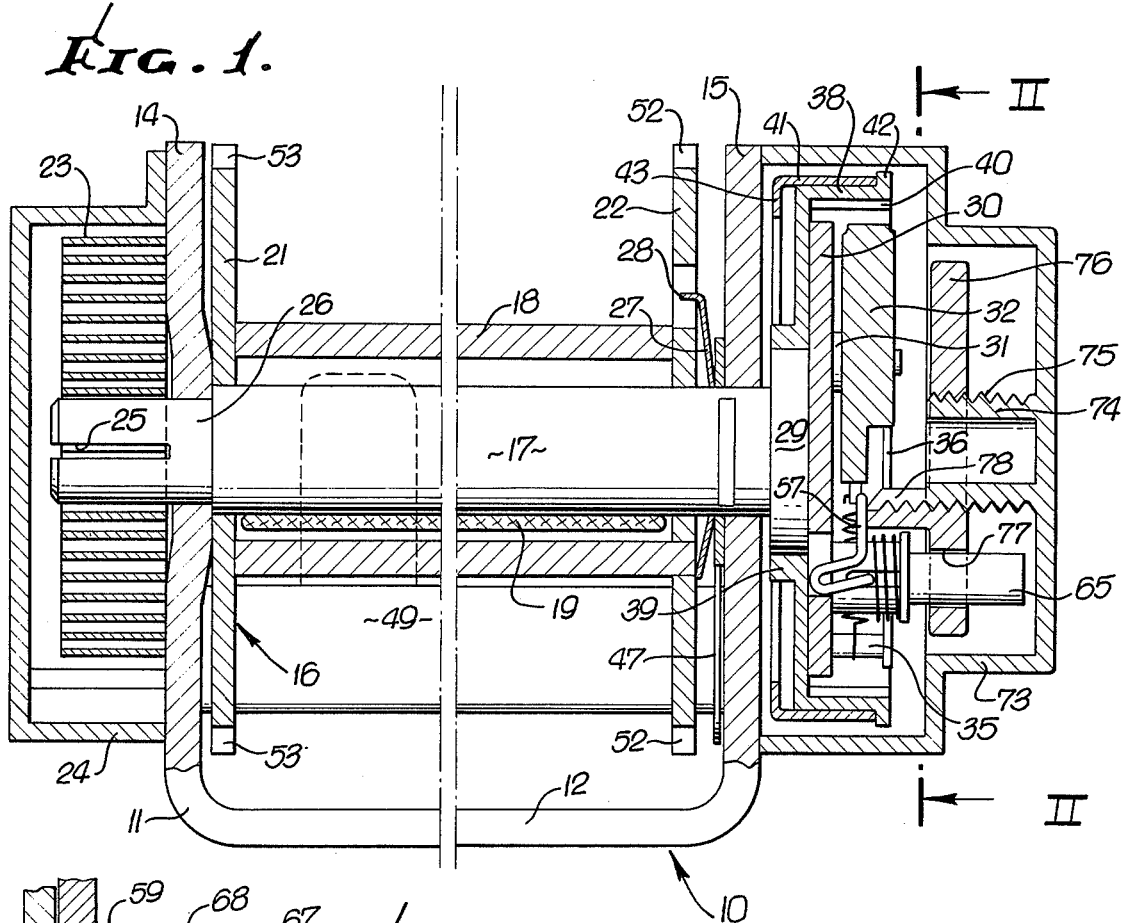
FIG. 1.
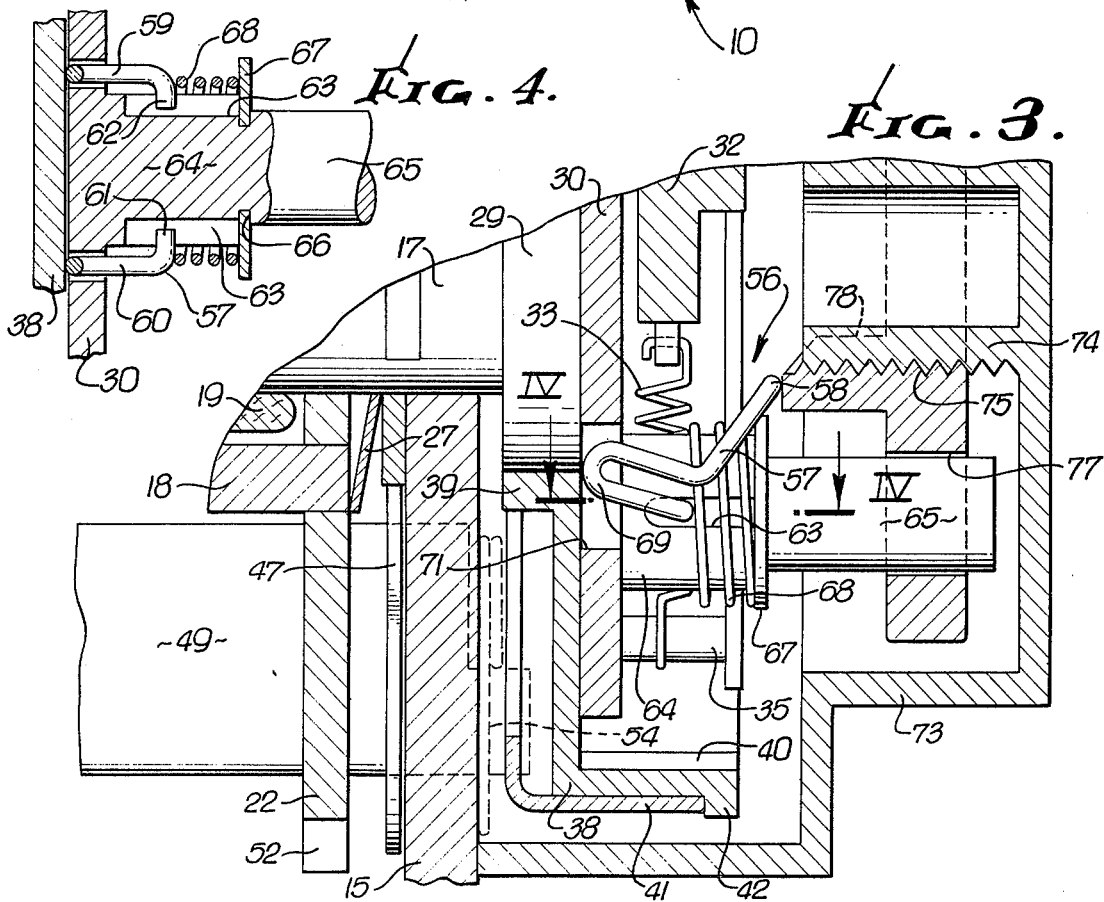
FIG. 4.
FIG. 3.

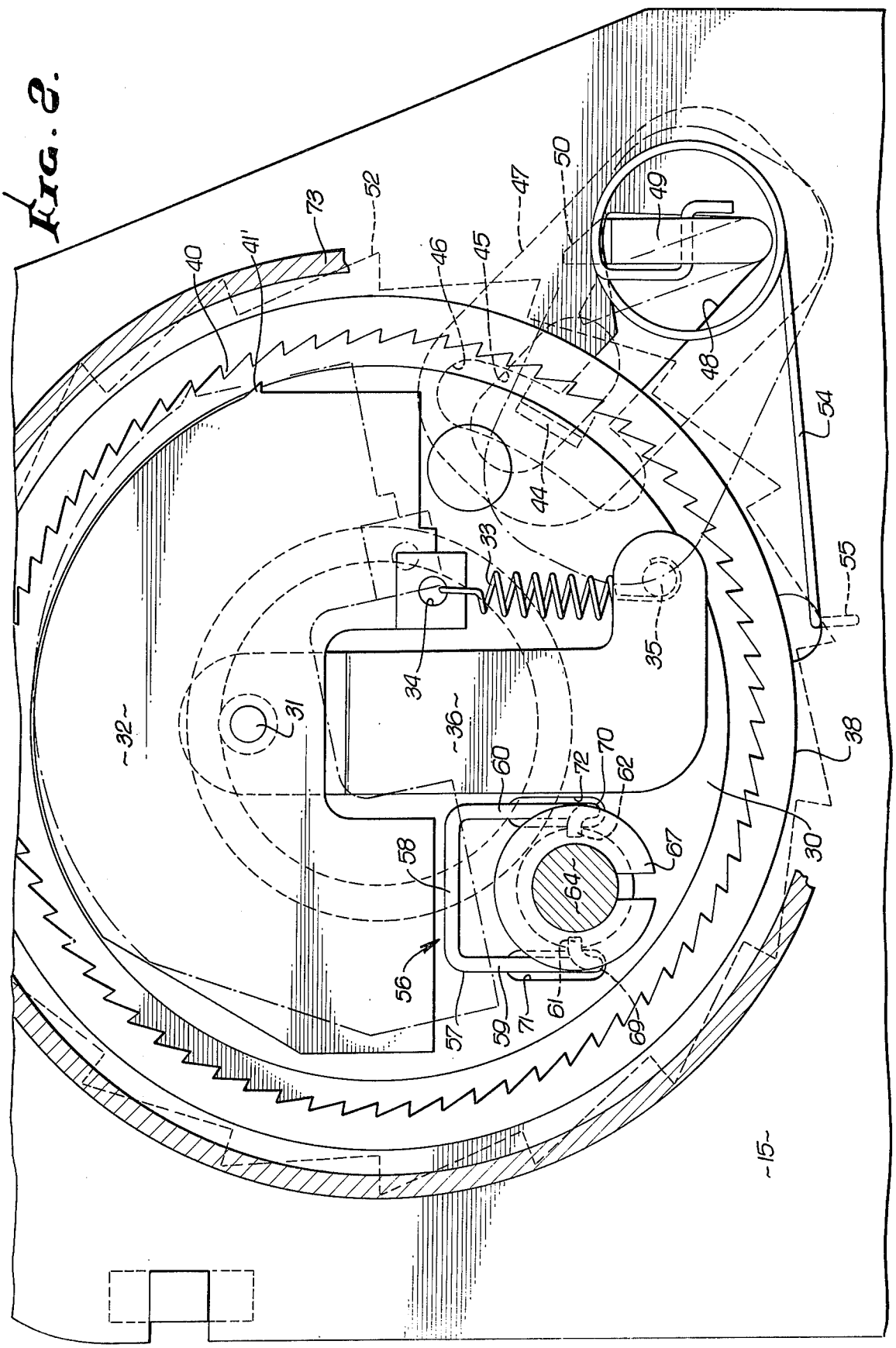

SAFETY BELT DEVICE

BACKGROUND OF THE INVENTION

1. Field of the Invention

The invention relates to improvements in safety belt devices, and, more particularly, to self-retracting safety belt reels or retractors for use on vehicles or the like.

2. Description of the Prior Art

Safety belt devices of the type disclosed herein have been developed over the years for use in aircraft, automobiles, and similar vehicles or the like. These devices generally combine a frame or casing having a spindle-supported reel thereon with a belt or strap automatically wound thereon and unwound therefrom in response to movements of the user. Such reels normally include a rewind spring to wind the belt or strap back onto the reel and cooperating locking means acting to lock the reel against rotation in case the strap, and hence the user, moves with respect to his seat at an excessive and dangerous acceleration.

However, it is desirable on such devices to make the reel "free spooling", i.e., the belt or strap mounting reel cannot accidentally lock up due to excessive acceleration of the strap during an initial protraction thereof by the user prior to buckling the safety belt into a condition of normal use, the reel thereafter locking upon a predetermined strap or belt acceleration. Certain prior art devices that attempted to accomplish this normally have provided for only limited free spooling during only a given number of initial unwinding turns of the reel on protraction of the strap. Other prior art devices have provided unlocking discs frictionally driven by the reel and acting directly on the locking bar to hold it unlocked during protraction. The former have the disadvantage of possible premature locking while the latter have introduced an undesirable friction drag during pulling out of the strap.

SUMMARY OF THE INVENTION

It is an object of this invention to provide a safety belt device whereby the belt or strap may be freely pulled therefrom without the possibility of any accidental lockup of the belt or strap due to the user's accelerating the belt or strap above a predetermined lockup acceleration rate when placing the belt or strap in use and which does not introduce undesirable drag or frictional forces.

It is a further object of this invention to provide such a device where, upon slight retraction of the belt or strap, the belt or strap locking means will be free to lockup upon acceleration of the strap above said predetermined rate.

These and other objects are preferably accomplished by providing a safety belt retractor having a frame, a strap receiving spool mounted for rotation on the frame with the spool being urged into a strap wound position and a lockbar is provided having a pawl for engaging the teeth of a ratchet tooth gear. Inertia responsive means are associated with the lockbar and are responsive to sudden acceleration of the strap off the spool for causing the lockbar pawl to engage with the teeth. The inertia responsive means is selectively blocked by blocking means from causing the pawl to engage with the teeth upon sudden acceleration of the strap off of the spool during protraction of the spool. The blocking means is responsive to a retractive movement of the strap to move into a released position.

BRIEF DESCRIPTION OF THE DRAWING

FIG. 1 is a vertical cross-sectional view of the safety belt device of this invention;

FIG. 2 is a side view with portions thereof omitted for convenience of illustration of the safety belt device of FIG. 1, taken along lines II—II thereof;

FIG. 3 is a detailed cross-sectional view of a portion of the device of FIG. 2; and FIG. 4 is a sectional view taken along lines IV—IV FIG. 3.

DESCRIPTION OF THE PREFERRED EMBODIMENT

Referring now to the drawings, reference numeral 10 designates the safety belt device in accordance with my invention. Safety belt device 10 includes a frame member 11 of substantially U-shape having a base 12 that is adapted to be secured or otherwise attached by a suitable fastener passing through an aperture (not shown) in base 12, as is well known in the art, for attachment to a desired support in the vehicle, such as the back of the user's seat or the vehicle frame or door jamb as where device 10 is used in a vehicle such as an automobile or the like. The upstanding spaced legs or endwalls 14 and 15 of frame member 11 are provided with aligned bearing apertures for rotatably supporting a transversely extending reel, indicated generally at 16, consisting of a spindle or shaft 17 and a surrounding spool 18, the shaft 17 having its end portions extending through apertures in legs 14, 15. The hub of spool 18 is of substantially C-shaped cross-section with its inner surface spaced from shaft 17 so as to accommodate the looped end 19 of a strap which latter extends outwardly through the opening in the C-shaped spool hub portion. A portion of the strap is adapted to be wrapped around the spool hub portion as is well known in the safety belt art, being confined between guide flanges 21 and 22 fixed to the ends of this hub portion. A reel casing (not shown) may also be carried by endwalls or legs 14 and 15 for covering reel 16. As is well known in the art, a portion of the strap is normally maintained in wrapped condition about the spool 18 by means of a spiral spring 23 that has its outer end fixed to the inner wall of a spring cup 24 attached to endwall 14 and its inner end fitted into a slot 25 provided in a reduced end portion 26 of shaft 17. The spring 23 tends to wind the strap upon the spool 18 by turning the reel, indicated generally at 16, consisting of shaft 17 and spool 18, within the bearings in endwalls 14 and 15. The free end portion of the strap is adapted to extend outwardly of the reel casing (not shown) for attachment to the user's shoulder harness or the like (also not shown).

A U-shaped bowed spring member or retainer 27 is interposed between the guide flange 22 and endwall 15 with its legs engaged in slots provided in the sides of spindle or shaft 17 and presses against these members 22 and 15 to retain shaft 17 in place within the reel, indicated generally at 16. Also, spring member 27 has a bent-over lug 28 engaged in an aperture in flange 22 to retain the shaft 17 and spool 18 in an assembled relationship. The portion of shaft 17 projecting outwardly of endwall 15 is provided with an enlarged head portion 29 conformably fitting into the non-circular hub aperture of a circular flange member 30, whereby this latter member turns with spindle or shaft 17 in use. Flange member 30 has a cylindrical boss 31 thereon (FIG. 2)

radially offset from the axis of shaft 17, and a substantially semicircular inertia member or plate 32 is turnably mounted thereon with the axis of boss 31 passing through the center of gravity of the inertia member or plate 32.

A coil calibration tension spring 33 has one end thereof connected to an aperture 34 in inertia member 32 at one side of boss 31 and has its other end connected to a boss 35 provided on flange member 30 and acts to normally hold inertia member or plate 32 in position. As will further be discussed hereinbelow, the tension of calibration spring 33 determines the G-setting of the safety belt device, indicated generally at 10. An L-shaped retainer plate 36 is shown attached to the end of shaft 17 and has apertures therein for passing over the ends of bosses 31 and 35 to thereby retain the inertia member 32 and calibration spring 33 in place.

A circular cup member 38 (see FIG. 1) has a hub portion 39 turnably mounted on the hub of flange member 30 and extends radially outwardly and over the inertia member 32. The interior cylindrical surface of cup member 38 is provided with ratchet teeth 40 for cooperating with one or more similar teeth 41' (see particularly FIG. 2) provided on the peripheral surface of inertia member 32. A split annular clutch spring 41 embraces the outer cylindrical surface of cup member 38. The outer edge of this clutch spring 41 abuts an annular retaining boss 42 formed on cup member 38 and the inner edge of clutch spring 41 has spaced fingers 43 formed thereon for retaining clutch spring 41 on cup member 38. The clutch spring 41 resiliently grips the peripheral surface of cup member 38 with a definite predetermined pressure. Thus, the clutch spring 41 and cup member 38 constitute a preloaded clutch, whereby the clutch spring 41 tends to turn with the cup member 38 but will slip thereon if held against turning by a force exceeding a predetermined amount.

Clutch spring 41 has a lug or tab 44 projecting therefrom which lug 44 extends into a slot 45 formed in a biasing spring lever member 47 as shown in FIG. 2 to provide a stop as will be discussed further hereinbelow and into an opening 46 formed in end plate 15. Lever member 47 is of substantially flat rectangular shape and opening 46 is provided with an inclined rectangular portion 48 for conformably receiving an end of a transversely extending lockbar 49 that is pivotally supported at its end portions in suitable apertures provided in endwalls 14 and 15. Lockbar 49 has two teeth 50 thereon (only one visible in FIG. 2) for respectively engaging teeth 52 and 53 provided on guide flanges 22 and 21. An elongated spring member 54 is secured at one end via a tie bar 55 to endwall 15 and extends about and is secured at the other end to lockbar 49. Thus, the teeth 50 of lockbar 49 are normally biased out of locking position with the teeth 52 and 53 of guide flanges 21 and 22.

As particularly contemplated within the present invention, free pull means are provided for preventing accidental lockup of the webbing or strap due to a person's accelerating the strap or webbing when placing it in use. In the exemplary embodiment, as seen particularly in FIGS. 1 and 3, such free pull means, indicated generally at 56, includes a yoke-like member 57 which includes a bight portion 58 which bight portion 58, as shown particularly in FIG. 2, underlies the inertia member or plate 32 during initial protraction of the strap as will be discussed further hereinbelow. As shown more clearly in FIG. 2, member 57 includes spaced legs 59 and 60 integral with bight portion 58 and terminating in inwardly turned ears 61 and 62, respectively. These ears 61 and 62 ride in spaced slots 63 formed in an extension portion 64 (see FIG. 3) of flange member 30. Extension portion 64 includes an integral enlarged portion 65 thus forming a shoulder 66 (see FIG. 4). As also shown in FIG. 4, a split ring 67 surrounds extension portion 64 and abuts against shoulder 66. As shown in the drawings, a generally circular spring 68 also surrounds extension portion 64 between ring 67 and ears 61, 62 to bias member 57 into position as will be discussed hereinbelow.

The legs 59, 60 of member 57 include curved extension portions 69, 70, respectively, which ride in slots 71, 72, respectively, in flange member 30. A housing 73 is secured to leg or endwall 15 and surrounds the various components. This housing 73 includes an inwardly extending member 74 generally coaxially aligned with shaft 17 and being threaded externally therealong, as at threads 75. A nut 76 is threadably mounted on threads 75 and includes an aperture 77 therein aligned with the enlarged portion 65 of extension portion 64. In this manner, as nut 76 moves between its positions as shown in FIGS. 1 and 3, and as will be explained further hereinbelow, nut 76 moves axially along extension portion 64 due to the extension of portion 65 into aperture 77. As shown in FIGS. 1 and 3, nut 76 includes an inwardly protruding cam portion 78 which, in its FIG. 1 position, engages the upper portion of member 57. Cam portion 78 preferably has a cross-section of arcuate extent.

In operation, the yoke-like member 57 is pivoted at its lower ends or ears 61, 62 upon the revolving or rotating flange member 30 with a portion of member 57 (i.e., extension portions 69, 70) riding against the stationary hub portion 39 of cup member 30. When flange member 30 revolves during protraction of the strap from reel 16, the frictional forces exerted upon member 57 tend to hold it in position blocking inertia plate 32 as seen in FIG. 2. Upon a slight retraction of the strap via return spring 23 as discussed hereinabove with regard to the rewinding of strap upon spool 18, the frictional forces are in a generally opposite direction which cause yoke-like member 57 to pivot in an opposite direction (i.e., to the position of FIG. 3). The spring 68 as shown in FIG. 3, is mounted overcenter with respect to member 57, and thus, as extension portions 69, 70 of member 57 move upwardly in slots 71, 72, then past the overcentering position of spring 68, the yoke-like member 57 is positively moved or kicked into the position of FIG. 3. This of course unblocks inertia plate 32. Thus, during protraction of the strap, the yoke-like member 57 blocks inertia plate 32 until there is a slight retraction of the strap. In this manner, accidental lockup of the strap cannot take place due to the user's accelerating the strap above a predetermined lockup acceleration rate when placing the strap in use. Of course, a slight retraction of the strap pivots member 57 out of the way and allows plate 32 to operate to lockup upon an acceleration of the strap above the predetermined weight as will be described hereinbelow.

Meanwhile, the cam portion 78 of nut 76 abuts against yoke-like member 57 and thus prevents premature pivoting movement of member 57, even if a slight retraction is applied to the strap, until a predetermined amount of the strap is unreeled off reel 16. That is, as shaft 17 is rotated, nut 76 moves axially along member 74 to the position in FIG. 3 thereby unblocking member 57 by the disengagement of cam portion 78.

Spring 54 is normally biasing lockbar 49 and thus pawl teeth 50 out of locking engagement with the teeth 52, 53 of flanges 21, 22.

It can therefore be seen that in the event of a crash resulting in a sudden deceleration of the vehicle, the user's body tends to be thrown forward suddenly so that the strap starts to pay out of reel 16 with acceleration. Depending upon the tension of calibration spring 33, if a predetermined dangerous acceleration of the user's body is reached, the inertia plate 32 will tend to maintain its original velocity and hence will turn with respect to its pivotal support on boss 31 on flange member 30, thus turning counter-clockwise as viewed in FIG. 2 against the tension of spring 33 so that its ratchet tooth 41 engages ratchet teeth 40 on cup member 38 due to the eccentric mounting of inertia plate 32 with respect to reel shaft 17. Thus, cup member 38 is now caused to turn clockwise within reel 16, and clutch spring 41 turning therewith moves via tab 44 within slot 45 thus moving lever member 47 and lockbar 49. The teeth 50 of lockbar 49 are thus urged by spring member 54 to lock flanges 21, 22 simultaneously to prevent further payout of the strap. With reel 16 so locked and held firmly at both ends, the shaft 17 is relieved of high torsional loads which otherwise would occur were reel 16 locked at one end only, so that device 10 is capable of withstanding enormous strap loads in use.

Once the force on the strap is relieved, then it will retract automatically through the action of rewind spring 23. As the spring 23 starts to rewind, the flange member 30 will start to turn counter-clockwise, as viewed in FIG. 2, causing the tooth 41 of inertia plate 32 to disengage the teeth 40 of cup member 38, and spring 33 will turn inertia plate 32 back to its original solid line position. The return of inertia plate 32 will also move clutch spring 41 back to its position in FIG. 2 whereby lever member 47 and spring 54 returns lockbar 49 to its original solid line position. This of course unlocks pawl teeth 50 from teeth 52, 53 of flanges 21, 22 thus placing reel 16 in condition for another locking operation when required. There is no possibility of device 10 locking during windup of spring 23.

In addition, although a specific embodiment has been described hereinabove showing pawl blocking means for translating a lockup between the inertia plate 32 and its surrounding cup member 38 into a locking motion of lockbar 49, such pawl blocking means may, as particularly contemplated by my invention, be carried out in a differing manner, as for example, those described in a copending application Ser. No. 379,710, to Ulrich et al, commonly assigned, the subject matter therein pertaining to such pawl blocking means being incorporated herein by reference.

In summary, it can be seen from the foregoing that upon actuation of inertia plate 32, a positive quick engagement takes place to lock reel 16 from further paying out of the strap. However, means are provided for retaining inertia plate 32 in non-locking condition with cup member 38 during various stages of use thereof. When spool 18 is fully wound up, a strap state sensing means in the form of the engagement of the cam portion 78 of nut 76 with yoke-like member 57 holds the inertia plate 32 from locking engagement with cup member 38. At the same time the "free pull" means, indicated generally at 46, retains inertia plate 32 from movement into locking engagement with cup member 38 even when the aforementioned strap state sensing means has become inactive. Upon a slight retraction of the strap, the free pull means is disengaged and the inertia responsive means is now in position to be activated by sudden acceleration of the strap to move lever member 47 and lockbar 49 carried thereby so as to lock the teeth 50 of lockbar 49 into engagement with 52, 53 of flanges 21, 22. Spring member 54 urges lockbar 49 out of locking engagement. There is thus no possibility of accidental lockup before the strap is payed out due to rapid acceleration by the user.

It can be seen from the foregoing that an improved seat belt device or the like is described having novel means for permitting free pull of the strap from the assembly while both the rolled-up condition of the strap on the reel of the device is being sensed and the inertia operated locking means is blocked.

However, once the strap is payed out and retracted, the inertia operated locking means is unblocked to thus lock up the reel immediately upon sudden acceleration of the strap.

I claim:

1. In a safety belt retractor having a strap receiving spool mounted for rotation in a frame with said spool being urged into a strap wound position and including a lockbar having at least one locking pawl thereon adapted to engage the teeth of a ratchet tooth gear on the spool, inertia responsive means adapted to engage said lockbar in response to sudden acceleration of said strap off said spool and move said lockbar to cause said pawl to engage with said teeth, the improvement comprising the provision of:

means operatively connected to said spool adapted to block said inertia responsive means thereby for selectively preventing said inertia responsive means for causing said pawl to engage with said teeth upon sudden acceleration of said strap off said spool until a retractive movement of said spool releases said inertia responsive means to thereby cause said pawl to engage with said teeth.

2. The improvement in the retractor of claim 1 wherein said means for selectively blocking said inertia responsive means further includes a flange connected to said spool for rotation therewith, a pivoted member, and means for mounting said pivoted member for positioning a first portion of said pivoted member in blocking relation to said inertia responsive means, and a second portion in surface engagement with said flange, whereby, during protraction of said strap, said pivoted member is urged into a blocking position and, upon a retractive movement, is urged by engagement between said flange and said second portion out of blocking engagement.

3. The improvement in the retractor of claim 1 wherein said means for selectively blocking said inertia responsive means also includes a nut threadably mounted on said frame and axially movable in a direction away from said pivoted member first portion when said strap is unrolled off said spool, said nut having a camming portion thereon movable from a first position whereby said camming portion holds said pivoted member in position blocking said inertia responsive means prior to said strap being unrolled off said spool to a second position whereby said camming portion moves to a position unblocking said inertia responsive means when a predetermined amount of said strap is unrolled off said spool.

4. The improvement in the retractor of claim 2 wherein said pivoted member includes a yoke-like member having spaced legs pivotally mounted at one end to said frame, said legs including portions thereof extending into slots in said frame and being selectively movable therein, a yoke portion integral with the other end of said legs, said yoke portion underlying said inertia responsive means, and resilient means biasing said yoke portion into a position underlying said inertia responsive means.

5. The improvement in the retractor of claim 4 wherein said slots are mounted offset with respect to the axis of rotation of said shaft, the retraction of said strap back onto said spool rotating said flange in a manner moving said yoke-like member out of position underlying said inertia responsive means.

6. The improvement in the retractor of claim 5 wherein the leg portions of said yoke-like member are mounted overcenter with respect to said slots.

7. The improvement in the retractor of claim 6 wherein said camming portion abuts against said yoke portion when in said first position.

8. In a safety belt retractor having a strap receiving spool normally urged into a strap rewind position, locking means including a lockbar for locking said spool against protraction, said inertia responsive means for causing lockup of said lockbar upon acceleration of said strap off of said spool at a rate above a predetermined amount, the improvement comprising the provision of:

blocking means adapted to engage said inertia responsive means in blocking relationship thereto for normally blocking operation of said inertia responsive means and being responsive to a retractive movement of said strap back onto said spool after an initial protraction therefrom to allow operation of said inertia responsive means to thereby cause lockup of said lockbar upon a subsequent acceleration of said strap above a predetermined amount.

9. The improvement in the retractor of claim 8 wherein said means for normally blocking operation of said inertia responsive means includes a flange member connected to said spool for rotation therewith, and a yoke-like member having spaced legs pivotally mounted at one end of said frame, said legs including portions thereof extending into slots in said frame and being selectively movable therein, a yoke portion integral with the other end of said legs, said yoke portion underlying said inertia responsive means, and resilient means biasing said yoke portion into a position underlying said inertia responsive means.

10. The improvement in the retractor of claim 9 wherein said slots are mounted offset with respect to the axis of rotation of said spool, the retraction of said strap back onto said spool rotating said flange member in a manner moving said yoke-like member out of position underlying said inertia responsive means.

11. The improvement in the retractor of claim 10 wherein the leg portions of said yoke-like member are mounted overcenter with respect to said slots.

12. The improvement in the retractor of claim 11 wherein said camming portion abuts against said yoke portion when in said first position.

* * * * *